(12) United States Patent
Ferritto et al.

(10) Patent No.: US 12,664,183 B2
(45) Date of Patent: Jun. 23, 2026

(54) ONLINE QUESTION ANSWERING, USING READING COMPREHENSION WITH AN ENSEMBLE OF MODELS

(71) Applicant: International Business Machines Corporation, Armonk, NY (US)

(72) Inventors: Anthony Ferritto, Somers, NY (US); Radu Florian, Danbury, CT (US); James William Murdock, IV, Amawalk, NY (US); Avirup Sil, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 1218 days.

(21) Appl. No.: 17/384,690

(22) Filed: Jul. 23, 2021

(65) Prior Publication Data

US 2023/0023958 A1 Jan. 26, 2023

(51) Int. Cl.
*G06F 16/3329* (2025.01)
*G06F 3/0482* (2013.01)
(Continued)

(52) U.S. Cl.
CPC ........ *G06F 16/3329* (2019.01); *G06F 3/0482* (2013.01); *G06F 3/04842* (2013.01);
(Continued)

(58) Field of Classification Search
None
See application file for complete search history.

(56) References Cited

U.S. PATENT DOCUMENTS 10,339,216 B2 7/2019 Marcus
11,450,225 B1 * 9/2022 Kilari ..................... G06F 40/30
(Continued)

FOREIGN PATENT DOCUMENTS

CN 107247666 A 10/2017
CN 108960319 A 12/2018
(Continued)

OTHER PUBLICATIONS

Peter Mell and Timothy Grance, The NIST Definition of Cloud Computing, NIST Special Publication 800-145, cover, pp. i-iii, 1-3, Sep. 2011.
(Continued)

*Primary Examiner* — Richa Sonifrank
(74) *Attorney, Agent, or Firm* — Seed Intellectual Property Law Group LLP

(57) ABSTRACT

Receive a question via a graphical user interface (GUI), obtain a passage of text potentially relevant to the question, and receive, via the GUI, a selection of a number of question-answering models to be ensembled. Produce a plurality of answers to the question by running a plurality of question-answering models, consistent with the selection of the number of question-answering models to be ensembled, on the passage of text. Produce an ensembled answer by ensembling the plurality of answers according to their respective confidence scores. Display, via the GUI, the ensembled answer in context of the passage of text, with the ensembled answer visually marked in the passage of text. Optionally, repeat these steps for a second passage of text.

14 Claims, 7 Drawing Sheets

(51) Int. Cl.

| | |
|---|---|
| *G06F 3/04842* | (2022.01) |
| *G06F 16/332* | (2025.01) |
| *G06F 40/109* | (2020.01) |
| *G06N 20/20* | (2019.01) |

(52) U.S. Cl.
CPC ........ *G06F 16/3328* (2019.01); *G06F 40/109* (2020.01); *G06N 20/20* (2019.01)

(56) References Cited

U.S. PATENT DOCUMENTS

| | | | | |
|---|---|---|---|---|
| 12,052,943 | B1* | 8/2024 | Merrill | G06N 20/00 |
| 2014/0358825 | A1* | 12/2014 | Phillipps | G06N 20/20 |
| | | | | 706/11 |
| 2017/0115658 | A1 | 4/2017 | Colt | |
| 2017/0278011 | A1 | 9/2017 | Castelli | |
| 2018/0300314 | A1 | 10/2018 | Xie | |
| 2018/0336487 | A1 | 11/2018 | Moore | |
| 2019/0138613 | A1 | 5/2019 | Adada | |
| 2019/0163812 | A1* | 5/2019 | Chakravarti | G06F 16/24578 |
| 2019/0311064 | A1* | 10/2019 | Chakraborty | G06F 16/90332 |
| 2020/0012948 | A1* | 1/2020 | Tian | G06N 5/01 |
| 2020/0050667 | A1* | 2/2020 | Lin | G10L 15/16 |
| 2021/0117623 | A1* | 4/2021 | Aly | G06Q 10/40 |
| 2021/0117869 | A1* | 4/2021 | Plumbley | G06F 18/217 |
| 2021/0240776 | A1* | 8/2021 | Jawagal | G06N 3/049 |
| 2021/0342718 | A1* | 11/2021 | Park | G06F 16/334 |
| 2021/0382878 | A1* | 12/2021 | McElvain | G06F 16/243 |
| 2021/0406479 | A1* | 12/2021 | Werner | G06N 3/084 |
| 2022/0035993 | A1* | 2/2022 | Bhandarkar | G06F 40/169 |
| 2022/0051116 | A1* | 2/2022 | Yu | G06N 5/04 |
| 2022/0141263 | A1* | 5/2022 | Mauer | G06N 20/20 |
| | | | | 709/206 |
| 2023/0023958 | A1* | 1/2023 | Ferritto | G06F 16/3328 |
| 2024/0029755 | A1* | 1/2024 | Querze, III | G10L 21/0364 |
| 2025/0298821 | A1* | 9/2025 | Yu | G06F 16/3344 |

FOREIGN PATENT DOCUMENTS

| | | |
|---|---|---|
| CN | 109299753 A | 2/2019 |
| KR | 20190143415 A | 12/2019 |

OTHER PUBLICATIONS

Anthony Ferritto, Lin Pan, Rishav Chakravarti, Salim Roukos, Radu Florian, James William Murdock IV, and Avirup Sil, ARES: A Reading Comprehension Ensembling Service, In Proceedings of the 2020 Conference on Empirical Methods In Natural Language Processing: System Demonstrations Oct. 2020 (pp. 31-37). Grace Period Disclosure.

Alberti, Chris, et al. "Synthetic QA corpora generation with roundtrip consistency." arXiv preprint arXiv:1906.05416 (Jun. 2019). pp. 1-7.

Chakravarti, Rishav, et al. "CFO: A framework for building production NLP systems." arXiv preprint arXiv:1908.06121 (Nov. 2019). pp. 1-6.

Cormack, Gordon V., Charles LA Clarke, and Stefan Buettcher. "Reciprocal rank fusion outperforms condorcet and Individual rank learning methods." Proceedings of the 32nd international ACM SIGIR conference on Research and development in information retrieval. Jul. 2009. pp. 1-2.

Devlin, Jacob, et al. "Bert: Pre-training of deep bidirectional transformers for language understanding." arXiv preprint arXiv:1810. 04805 (Jun. 2018). pp. 1-16.

Kurland, Oren, and J. Shane Culpepper. "Fusion in information retrieval: Sigir 2018 half-day tutorial." The 41st International ACM SIGIR Conference on Research & Development in Information Retrieval. Jul. 2018. pp. 1-4.

Kwiatkowski, Tom, et al. "Natural questions: a benchmark for question answering research." Transactions of the Association for Computational Linguistics 7 (Jul. 2019): 453-466.

Lan, Zhenzhong, et al. "Albert: A lite bert for self-supervised learning of language representations." arXiv preprint arXiv:1909. 11942 (Feb. 2020). pp. 1-17.

Liu, Dayiheng, et al. "Rikinet: Reading wikipedia pages for natural question answering." arXiv preprint arXiv:2004.14560 (Apr. 2020). pp. 1-10.

Liu, Yinhan, et al. "Roberta: A robustly optimized bert pretraining approach." arXiv preprint arXiv: 1907.11692 (Jul. 2019). pp. 1-13.

Ma, Yue, et al. "An end-to-end dialogue state tracking system with machine reading comprehension and wide & deep classification." arXiv preprint arXiv:1912.09297 (Feb. 2020). pp. 1-8.

Wang, W., et al. "R-net: Machine reading comprehension with self-matching networks." Microsoft Research Asia, Beijing, China, Tech. Rep 5 (Aug. 2017). pp. 1-11.

Pan, Lin, et al. "Frustratingly easy natural question answering." arXiv preprint arXiv:1909.05286 (Sep. 2019). pp. 1-8.

Pedregosa, Fabian, et al. "Scikit-learn: Machine learning in Python." the Journal of machine Learning research 12 (Oct. 2011): 2825-2830.

Qu, Chen, et al. "Open-retrieval conversational question answering." Proceedings of the 43rd International ACM SIGIR conference on research and development in Information Retrieval. May 2020. pp. 1-10.

Rajpurkar, Pranav, Robin Jia, and Percy Liang. "Know what you don't know: Unanswerable questions for SQuAD." arXiv preprint arXiv:1806.03822 (Jun. 2018). pp. 1-9.

Rajpurkar "SQuAD: 100,000+ Questions for Machine Comprehension of Text" Proceedings of the 2016 Conference on Empirical Methods in Natural Language Processing, pp. 2383-2392, Austin, Texas, Nov. 1-5, 2016.

Seo, Minjoon, et al. "Bidirectional attention flow for machine comprehension." arXiv preprint arXiv:1611.01603 (Jun. 2018). pp. 1-13.

Wang, Alex, et al. "Glue: A multi-task benchmark and analysis platform for natural language understanding." International Conference on Learning Representations (May 2019). pp. 1-20.

Wu, Shenghi. "Data Fusion in Information Retrieval" Book (Springer). Jan. 2012. DOI: 10.1007/978-3-642-28866-1. pp. 1-242.

Yang, "End-to-End Open-Domain Question Answering with BERTserini". Proceedings of NAACL-HLT 2019: Demonstrations, pp. 72-77 Minneapolis, Minnesota, Jun. 2-Jun. 7, 2019.

Yang, Zhilin, et al. "XLNet: Generalized Autoregressive Pretraining for Language Understanding." arXiv preprint arXiv:1906.08237 (Jan. 2020). pp. 1-18.

Ferritto, Anthony, et al. "Ensembling Strategies for Answering Natural Questions." arXiv preprint arXiv:1911.00337 (Nov. 2019). pp. 1-6.

Alberti et al., "A Bert Baseline for the Natural Questions", Retrieved from: https://arxiv.org/abs/1901.08634, 2019, 4 pages.

* cited by examiner

| # Models | SA F1 | LA F1 |
|----------|-------|-------|
| 1 | 56.1 | 67.1 |
| 4 | 58.7 | 69.6 |

*FIG. 3*

| Search | $N_S$ | Type | SA F1 | LA F1 |
|--------|-------|------|-------|-------|
| - | - | - | 58.7 | 69.6 |
| ES | 20 | LA | 59.6 | 70.5 |
| ES | 20 | SA | 59.6 | 70.0 |
| GS | 41 | LA | 59.7 | 70.8 |
| GS | 41 | SA | 59.1 | 69.8 |

*FIG. 4*

| Aggregator | SA F1 | LA F1 |
|------------|-------|-------|
| Max | 59.7 | 70.8 |
| Exponential Sum | 58.3 | 70.4 |
| Reciprocal Rank Sum | 57.3 | 70.7 |
| Noisy-Or | 57.3 | 71.5 |

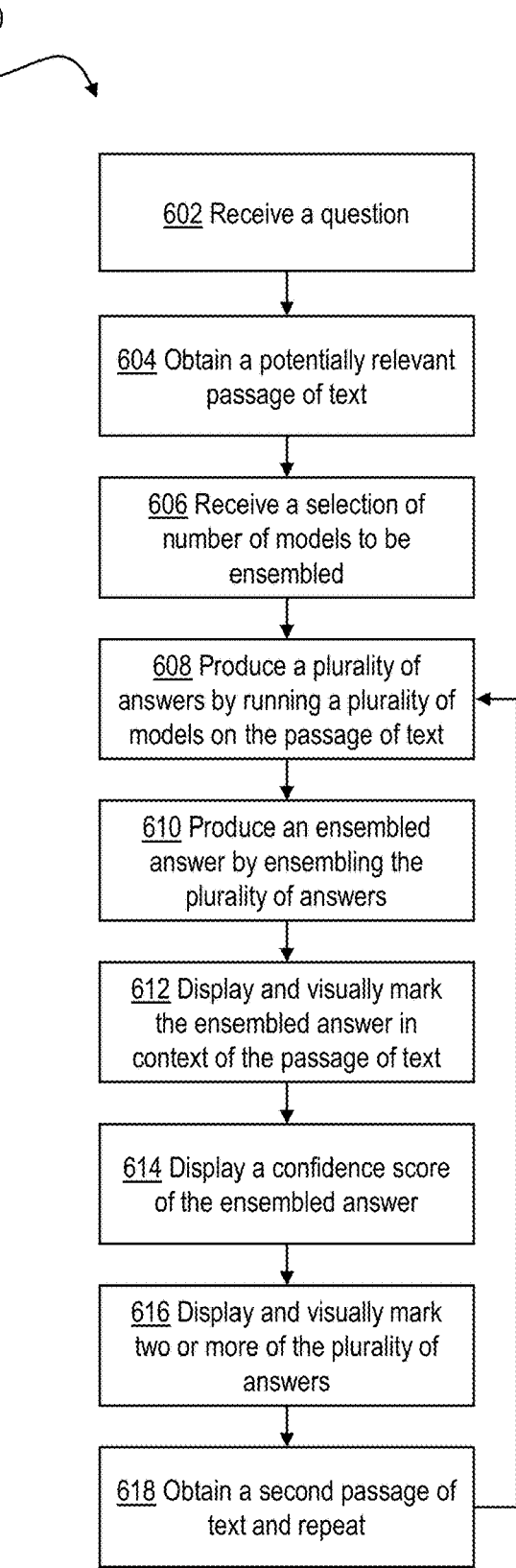

602 Receive a question

604 Obtain a potentially relevant passage of text

606 Receive a selection of number of models to be ensembled

608 Produce a plurality of answers by running a plurality of models on the passage of text 610 Produce an ensembled answer by ensembling the plurality of answers 612 Display and visually mark the ensembled answer in context of the passage of text 614 Display a confidence score of the ensembled answer 616 Display and visually mark two or more of the plurality of answers 618 Obtain a second passage of text and repeat

*FIG. 6*

ONLINE QUESTION ANSWERING, USING READING COMPREHENSION WITH AN ENSEMBLE OF MODELS

STATEMENT REGARDING PRIOR DISCLOSURES BY THE INVENTOR OR A JOINT INVENTOR

The following disclosure(s) are submitted under 35 U.S.C. 102(b)(1)(A):

Anthony Ferritto, Lin Pan, Rishav Chakravarti, Salim Roukos, Radu Florian, James William Murdock IV, and Avirup Sil, ARES: A Reading Comprehension Ensembling Service, In Proceedings of the 2020 Conference on Empirical Methods in Natural Language Processing: System Demonstrations 2020 October (pp. 31-37).

BACKGROUND

The present invention relates to the electrical, electronic, and computer arts, and more specifically, to natural language processing.

Machine Reading Comprehension (MRC) involves computer systems that can take a question and some text and produce an answer to that question using the content in that text.

Some MRC systems use ensembled models, i.e., multiple system outputs that are combined to produce a grouped output. However, these systems are not well-disclosed, and details of their functioning are unknown.

Information retrieval (IR) involves computer systems that can take some text and produce documents that are relevant to the text.

SUMMARY

Principles of the invention provide techniques for online question answering, using reading comprehension with an ensemble of models. In one aspect, an exemplary method includes receiving a question via a graphical user interface (GUI); obtaining a passage of text potentially relevant to the question; receiving, via the GUI, a selection of a number of question-answering models to be ensembled; producing a plurality of answers to the question by running a plurality of question-answering models, consistent with the selection of the number of question-answering models to be ensembled, on the passage of text; producing an ensembled answer by ensembling the plurality of answers according to their respective confidence scores; and displaying, via the GUI, the ensembled answer in context of the passage of text, with the ensembled answer being visually marked in the passage of text.

One or more embodiments of the invention or elements thereof can be implemented in the form of a computer program product including a computer readable storage medium with computer usable program code for facilitating the method steps indicated. Furthermore, one or more embodiments of the invention or elements thereof can be implemented in the form of a system (or apparatus) including a memory that embodies computer executable instructions, and at least one processor that is coupled to the memory and operative by the instructions to facilitate exemplary method steps. Yet further, in another aspect, one or more embodiments of the invention or elements thereof can be implemented in the form of means for carrying out one or more of the method steps described herein; the means can include (i) hardware module(s), (ii) software module(s)

stored in a tangible computer readable storage medium (or multiple such media) and implemented on a hardware processor, or (iii) a combination of (i) and (ii); any of (i)-(iii) implement the specific techniques set forth herein.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

These and other features and advantages of the present invention will become apparent from the following detailed description of illustrative embodiments thereof, which is to be read in connection with the accompanying drawings.

BRIEF DESCRIPTION OF THE DRAWINGS

FIG. 3 depicts experimental results from an architecture similar to FIG. 1, but excluding information retrieval, according to an exemplary embodiment.

FIG. 4 depicts experimental results from the architecture shown in FIG. 1, according to an exemplary embodiment.

FIG. 5 depicts experimental results from the architecture shown in FIG. 1, according to an exemplary embodiment.

FIG. 6 depicts in a flowchart a computer-implemented method according to an exemplary embodiment.

DETAILED DESCRIPTION

Figure 1:
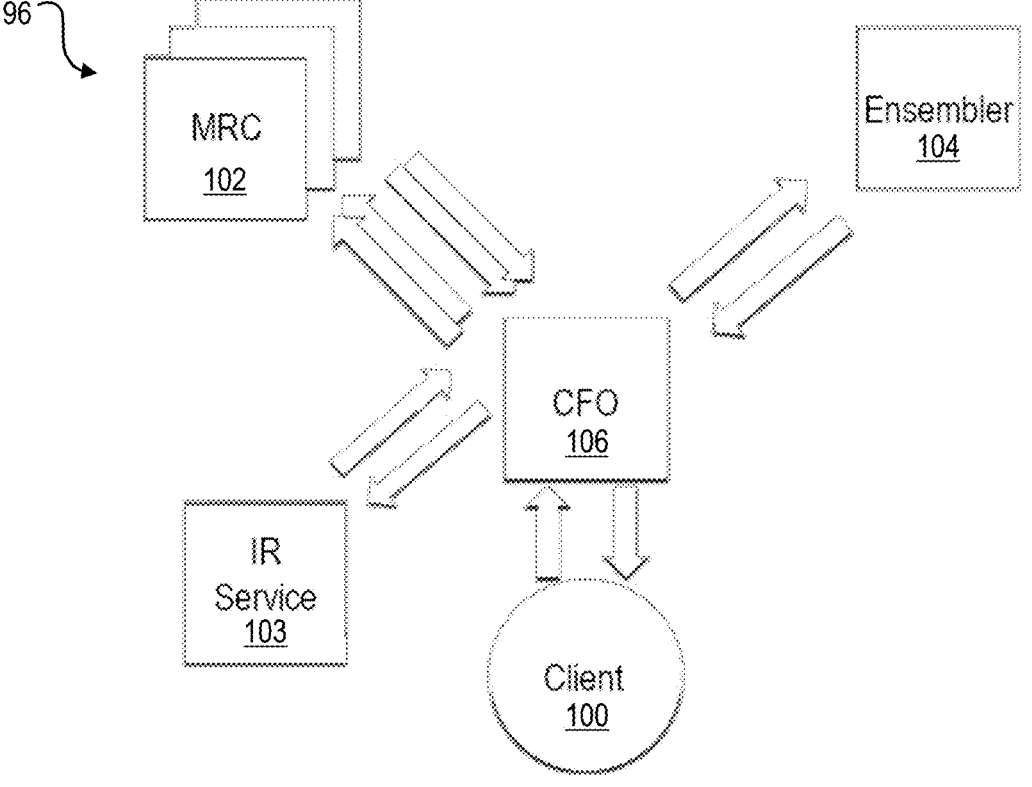
FIG. 1 depicts an architecture of an ensembling reading comprehension system, according to an exemplary embodiment.

Referring to FIG. 1, aspects of the invention provide an online question answering system 96 that is cloud-enabled and has a user interface 100 (e.g., residing on a client machine) by which a user can submit open questions and can adjust a number of models used, in ensemble, to answer those questions, based on the user's judgment as to a trade-off between performance and accuracy. "Open questions," in this context, means questions that are to be answered using a machine-reading comprehension (MRC) ensemble system or ARES 104 (according to aspects of the invention; note that "ARES" is a name used to refer to one specific embodiment with various features that can be included in a number of different embodiments), which in one or more embodiments is in communication with an information retrieval (IR) service 103. In other embodiments, the user submits a text passage or corpus along with the question, believing that an answer to the question can be found in the corpus. An aspect of one or more embodiments of the invention is combining the ARES 104 with the IR service 103 to answer an open question, under the interface

100. The interface 100 shows a user answers from all the underlying systems to obtain a more interpretable idea of how the overall system 96 arrived at a final ensembled answer ("proof of work" type interface). In one or more embodiments, the system 96 comprises the machine reading comprehension (MRC) services 102, the IR service 103, and the ARES 104.

In one or more embodiments, an orchestration framework for building, experimenting with, and deploying interactive machine reading comprehension (MRC) and IR (Information Retrieval) systems to production environments (such as, for example, IBM's Computation Flow Orchestrator (CFO) 106) orchestrates or coordinates the services 102, 103, 104 used by the client 100. The MRC services 102 (in one or more embodiments, variations of IBM's "Go Ahead, Ask Me Anything" (GAAMA) service) provide reading comprehension via a transformer model. In one or more embodiments, multiple services utilizing different model architectures are run to extract answers for a given question and corpus. After the MRC services 102 extract their individual answers from the user-submitted passage or from results of the IR service 103, the answers are all passed to the ensembling service 104, which ensembles the results. Both the ensembled and original answers are then returned to the caller, allowing the clients to display, to an end user, the final ensembled answers and the original answers from which they were generated.

In one or more embodiments, a "cloud-enabled" aspect of the invention is such that the user interface 100 enables a user to ask a question, either submit a passage of text in which the user expects an answer to be found, or else turn to the IR service 103 for obtaining a corpus of text, and then obtain an overall (ensembled) answer and individual model answers to the question based on the corpus, while choosing a number of models to be ensembled in order to provide the overall answer. In one or more embodiments, documents retrieved by the IR service 103 can be ranked by combining rankings from the MRC ensemble 102 and the IR service 103. In some embodiments in which the IR service 103 retrieves documents/passages or a corpus of text, a user can specify (via the interface 100) how many documents or how lengthy a corpus to obtain. In cases where the IR service 103 retrieves multiples passage, two or more passages can be simultaneously displayed to the user via the interface 100 and the interface 100 may provide the user an opportunity to select among the multiple passages. In certain embodiments using the IR service 103, a user may be prompted ahead of time to upload a corpus of text or to select a prior corpus (e.g., a user-edited knowledge repository or a range of scholarly journals). Generally, the corpus of text (several passages or documents) can be provided to the IR system and indexed for later retrieval.

One or more embodiments have certain practical applications. For example, aspects of the invention can be useful in improving the functionality of a computing system as a tool for use in contract review, scholarly research, legal discovery, or production of medical prescribing guidelines. Thus, in one or more embodiments, techniques of the present invention can provide substantial beneficial technical effects. For example, one or more embodiments provide one or more of:

The online question answering system 96, which implements a reading comprehension ensembling system (ARES) 104 that leverages predictions from multiple underlying machine reading comprehension (MRC) models 102 and ensembles the predictions to answer a user's questions with more accuracy than previously known MRC systems.

The online question answering system 96, which utilizes the ARES 104 in combination with an information retrieval (IR) system 103 to obtain and present best-guess answers to open questions posed by users.

The online question answering system 96, which has a system architecture that provides scalability to the system designer (by leveraging a cloud-ready CFO (Computation Flow Orchestrator) container orchestration framework) with flexibility to add and remove models from an ensemble in response to a user's chosen latency versus accuracy trade-off.

A GUI 100 with enhanced interpretability that allows users to see the (dis)agreement of responses from individual models 102 and select how many models to ensemble for on-the-fly tradeoffs of speed vs. accuracy.

A process for selecting a "best-diverse" set of models, based on an analysis of various ensembling strategies with experimental results, which shows that diversity of models is better for ensembling than seed variation.

Improving the technological functionality of a system of machine learning models used for answering users' questions, by enabling a user-selectable trade-off between accuracy and processor cycles.

Some embodiments may not have these potential advantages and these potential advantages are not necessarily required of all embodiments.

More completely, in one or more embodiments, the ARES 96 takes the following as input through a remote procedure call interface: question, text corpus, minimum confidence score threshold, maximum number of answers N, maximum number of answers per model n, and number of models k. These inputs are sent from the client 100 and are received by the CFO node 106, which orchestrates the containers (virtual machines) that run the ensembling services 104, the CFO 106, and the MRC services 102. The user's choice of k is bounded on how many GAAMA containers 102 are deployed (e.g., if there are 3 containers then $k \in \{1; 2; 3\}$). By "tweaking" the parameter k, a user can opt for increased accuracy (higher k) or decreased latency (lower k), inasmuch as, when multiple models run on the same GPU, the request latency increases. As depicted in FIG. 1, three MRC services 102 are running and two of the GAAMA containers 102 (i.e., k=2) then receive the question (and optionally, a text corpus) from the CFO 106, returning at most n answers to the CFO. These answers, together with their confidence scores, are then sent to the ensembler 104 by the CFO 106. The ensembler produces at most N ensembled answers (each with confidence score at least δ) and returns them to the CFO 106. In one or more embodiments, each model (MRC service 102) creates a list of scored candidate answers; if there are multiple instances of the same answer span, the highest score is kept; predictions for all systems are aggregated by averaging scores for each span (score=0 is imputed for cases when a system does not predict an answer); and the answers are sorted by their averaged scores (e.g., show the top scoring answer as the ensembled answer). Finally, the CFO 106 returns to the caller (user interface 100) the answers of the k models and the ensembled answers.

Figure 2:
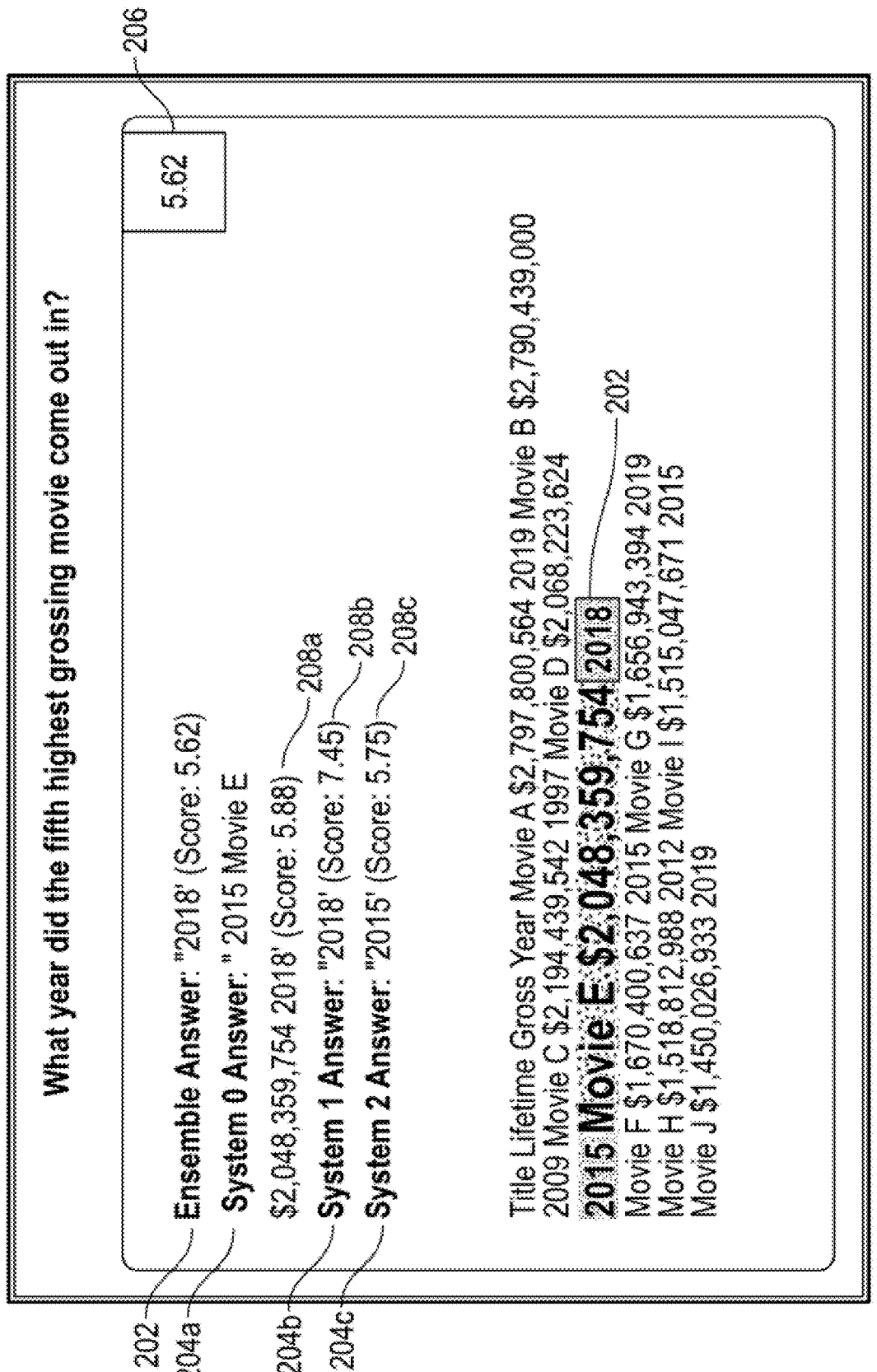
FIG. 2 depicts an output of the architecture shown in FIG. 1, according to an exemplary embodiment.

In one or more embodiments, the GUI client 100 (caller) for the system 96 is based on a ReactJS web interface. A request is taken as input from the user and sent to the system 96 where it is processed as described above. When an answer with sufficient confidence score is returned, it is displayed to the user, for example as shown in FIG. 2. Referring to FIG. 2, both the ensembled answer 202 and the individual answers 204*a*, 204*b*, 204*c* are shown, together with their respective confidence scores (ensemble score 206 and individual scores 208*a*, 208*b*, 208*c*). These answers are also shown in the context of the original corpus. The ensembled answer 202 is boxed in. For the individual answers, a character heatmap is created, representing how many of the candidate answers each character appears in. This heatmap is used to shade characters of the corpus with different intensities of shading or different colors that correspond to how many answers each character appears in (characters not used in any answers are not shaded). In one or more embodiments, both the boxing and shading of answers are done using MarkJS. Note that while these visualizations only show the top answer for each MRC model, n answers per model are ensembled together. If an answer with sufficient confidence score is not returned, this negative result is relayed to the user through the GUI 100. In one or more embodiments, two or more text passages are obtained and the GUI 100 displays multiple ensembled answers and individual answers, one set for each text passage. If the IR service 103 is used for obtaining one (or more) text passages, the confidence score of the ensembled answer(s) incorporates the confidence scores produced by the IR service 103 for the text passage(s) as well as the confidence score produced by the ensembling service 104 for the ensembled answer.

For each strategy considered, search for the best k-model ensemble over the "train" set and then evaluate on the "test" set. For these experiments use k=4 as this is the number of models that can be decoded in 24 hours.

A core strategy underlies the approaches that have been investigated. The strategy includes investigating a baseline approach of ensembling multiple versions of the same model trained with different seeds, then investigating search strategies for choosing the best models from candidates trained with different hyperparameters, in addition to different normalization and aggregation strategies that are used on a set of candidates.

For each example processed by the k systems being ensembled, the system assigns a score to each long and short span according to the normalization and aggregation strategies (see below).

One or more embodiments use the top-20 candidate long and short answers (LA and SA respectively) for each system. Other embodiments use only the short answers (SA). Although additional values could be used, experiments found that in one or more embodiments, 20 answers provide an ideal accuracy versus latency trade-off given hardware resources. To combine systems, take the arithmetic mean of the scores for each long and short span predicted by at least one system. In at least some instances, other approaches such as median, geometric mean, and harmonic mean result in much lower scores than arithmetic mean. For spans which are only predicted by some systems, a score of zero is assigned (for the systems which do not predict the span) to penalize spans which are only predicted by some systems. The predicted long span is then the span with the greatest arithmetic mean. Similarly for short answers, the predicted span is the one with the greatest arithmetic mean (it should also be in a non-null long answer span).

First, examine the baseline approach of ensembling k versions of the same model trained with the same hyperparameters, only varying the seed between models. Use the model with the best hyperparameters based on having the highest sum of short and long answer F1 scores. This model is trained k−1 additional times with different seeds and then the different trained models all are ensembled using the core strategy.

F1 scores are defined as the harmonic mean of precision and recall. For an MRC task, precision is defined as the number of correct answers produced divided by the total number of answers given by the system (as opposed to when the system predicts there is no correct answer in the given text). Recall is defined as the number of correct answers produced divided by the number of answers for which there is a correct (non-null) answer.

Consider two main strategies when searching for ensembles: exhaustive and greedy. These search over model candidates with different hyperparameters. Note also a "simple greedy" approach where the k best models are selected; however, this underperforms other approaches by 1-2 F1 points.

In exhaustive search, consider all possible ensembles, and score each possible ensemble, whereas in greedy search, build the ensemble one model at a time by looking for a model that can add to an i-model ensemble to make the best (i+1)-model ensemble. In other words, determine which next model produces the highest ensemble F1 score. A set of development data is split into training data used to build the ensemble, and test data used to evaluate the ensemble. These searches happen before the ensemble is implemented.

In the exhaustive search approach, consider each of the $$\binom{m}{k}$$

ensembles of k candidates from the group of m models, then use the core strategy for each ensemble to obtain short and long answer F1 scores for each ensemble. After searching all possible ensembles, return two ensembles: (i) the ensemble with the highest long answer F1 score and (ii) the ensemble with the highest short answer F1 score. In other embodiments, return only the ensemble with the highest SA F1 score.

In greedy search, select the models by greedily building 1; 2; . . . ; k model ensembles optimizing for short or long answer F1 using the core strategy.

There are two primary methods for post-processing the scores predicted for a span: not normalizing and normalizing by logistic regression. (Throughout this disclosure, "score" not otherwise specified means a "confidence score" assigned by a neural network.) Another option is normalizing by dividing the scores for a span by the sum of all scores for the span; however, this does not produce interesting results.

As a baseline, use the scores for a span as-is. Compare using logistic regression, where the confidence scores from the top predictions for the training examples are used to predict whether each example is correctly answered. In experiments, using the top example performed equally well to using the top 20 predictions per example to train on. In one or more embodiments, the scikit-learn implementation of logistic regression with stratified 5-fold cross-validation was used to select the L2 regularization strength.

There are a number of aggregation strategies to produce a single span score for each span predicted by a system for an example. These include the baseline approach of max as well as the exponentially decaying sum, reciprocal rank sum, and noisy-or methods influenced by IR. These approaches operate on a vector P of scores on which one of the above normalization strategies has been applied. The person skilled in the NLP field will be familiar with these techniques per se, and, given the teachings herein, can adapt same to implement one or more embodiments.

Consider two types of ensembling experiments: (i) ensembling the same model trained with different seeds and (ii) ensembling different models. Ensembling the same model trained on different seeds attempts to smooth the variance to produce a stronger result. On the other hand, ensembling different models attempts to find models that may not be the strongest individually, but that harmonize well to produce strong results. Throughout this section, SA F1 and LA F1 denote the short and long answer performance on a test set of examples. Similarly, NS indicates the number of models searched for an experiment and types SA and LA to indicate optimization for SA and LA F1 respectively.

FIG. 3 shows a benefit to ensembling multiple versions of the same model trained with different random-number seeds. Traditional approaches are believed to ensemble a single same model with same design and hyper-parameters, just changing a seed for a random number generator used in training. Later experiments (FIG. 4, FIG. 5) compared to 4-seed same model ensemble as baseline.

FIG. 4 depicts numeric results for different search strategies used to generate ensembles of models. The greedy approach performs best overall, with the greedy ensemble optimized for LA performance performing the best on both short and long answer F1. However, in certain embodiments LA optimization is not used. In such embodiments, it was noted that the exhaustive search produced better results for SA optimization. Note that the numbers seen here, particularly when optimizing greedily for long answer performance are higher than those observed for ensembling the same model with multiple seeds. It is believed that the superior generalization of greedy search is due to exhaustive search "overfitting." Accordingly, one or more embodiments use greedy search optimized for long answer F1 score.

FIG. 5 depicts results of various IR-inspired normalization strategies. For example, an experiment using max aggregation is run without normalization to greedily optimize for long answer F1 score. The other experiments are normalized with logistic regression. Using max aggregation results in the best short answer F1, whereas using normalized noisy-or aggregation results in the best long answer F1. Based on these results, one or more embodiments use unnormalized max for short answers and logistic regression normalized noisy-or works for long answers. This approach produces the strongest performance for both short and long answers with 59.3 SA F1 and 71.5 LA F1. Consequently, one or more embodiments use unnormalized max ensembling of GAAMA answers (as GAAMA works on short answers) from 4 models in ARES. These numbers translate to a full dev performance of 59.3 short answer F1 and 71.1 long answer F1, which represents an improvement of 2.3 short answer F1 and 4.0 long answer F1 over a single model.

Generally, a neural network includes a plurality of computer processors that are configured to work together to implement one or more machine learning algorithms. The implementation may be synchronous or asynchronous. In a neural network, the processors simulate thousands or millions of neurons, which are connected by axons and synapses. Each connection is enforcing, inhibitory, or neutral in its effect on the activation state of connected neural units. Each individual neural unit has a summation function which combines the values of all its inputs together. In some implementations, there is a threshold function or limiting function on at least some connections and/or on at least some neural units, such that the signal must surpass the limit before propagating to other neurons. A neural network can implement supervised, unsupervised, or semi-supervised machine learning.

Given the discussion thus far, and with particular reference to accompanying FIG. 6, it will be appreciated that, in general terms, an exemplary computer-implemented method 600, according to an aspect of the invention, includes several steps. At 602, receive a question via a graphical user interface (GUI). At 604, obtain a passage of text potentially relevant to the question (e.g., via an IR service or directly from a user client via the GUI). At 606, receive, via the GUI, a selection of a number of question-answering models to be ensembled. At 608, produce a plurality of answers to the question by running a plurality of question-answering models, consistent with the selection of the number of question-answering models to be ensembled, on the passage of text. At 610, produce an ensembled answer by ensembling the plurality of answers according to their respective confidence scores. At 612, display, via the GUI, the ensembled answer in context of the passage of text, with the ensembled answer being visually marked in the passage of text.

In one or more embodiments, the method further includes, at 614, displaying, via the GUI, an overall confidence score of the ensembled answer.

In one or more embodiments, the method further includes, at 616, displaying, via the GUI, two or more of the plurality of answers in addition to the ensembled answer, with the two or more of the plurality of answers being visually marked in the passage of text in a manner different than the ensembled answer, as shown in FIG. 2. In one or more embodiments, the method further includes visually marking each character of each of the two or more of the plurality of answers according to a number of answers in which each character occurs, as shown in FIG. 2. In one or more embodiments, the method further includes visually marking each character of the two or more of the plurality of answers in a color corresponding to the number of answers in which each character occurs. In FIG. 2, different densities of stippling correspond to different shades or intensities of color. In one or more embodiments, the method further includes visually marking each character of the two or more of the plurality of answers with a font size corresponding to the number of answers in which each character occurs.

In one or more embodiments, the method further includes, at 618: obtaining a second passage of text potentially relevant to the question; producing a second plurality of answers to the question by running the plurality of question-answering models, consistent with the selection of the number of question-answering models to be ensembled, on the second passage of text; producing a second ensembled answer by ensembling the second plurality of answers according to their respective confidence scores; and displaying, via the GUI, the second ensembled answer in context of the second passage of text, with the second ensembled answer being visually marked in the second passage of text.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
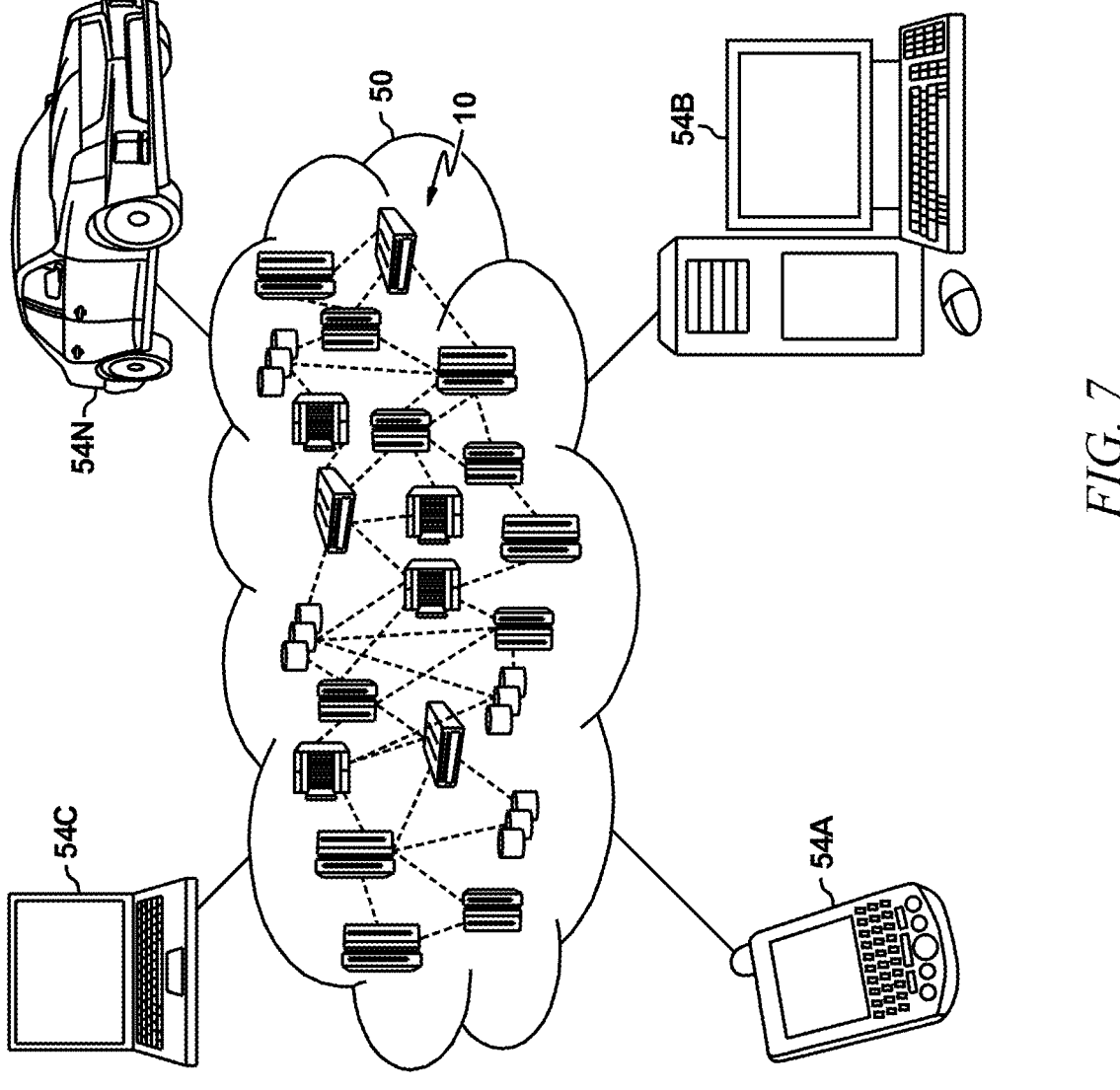
FIG. 7 depicts a cloud computing environment according to an embodiment of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
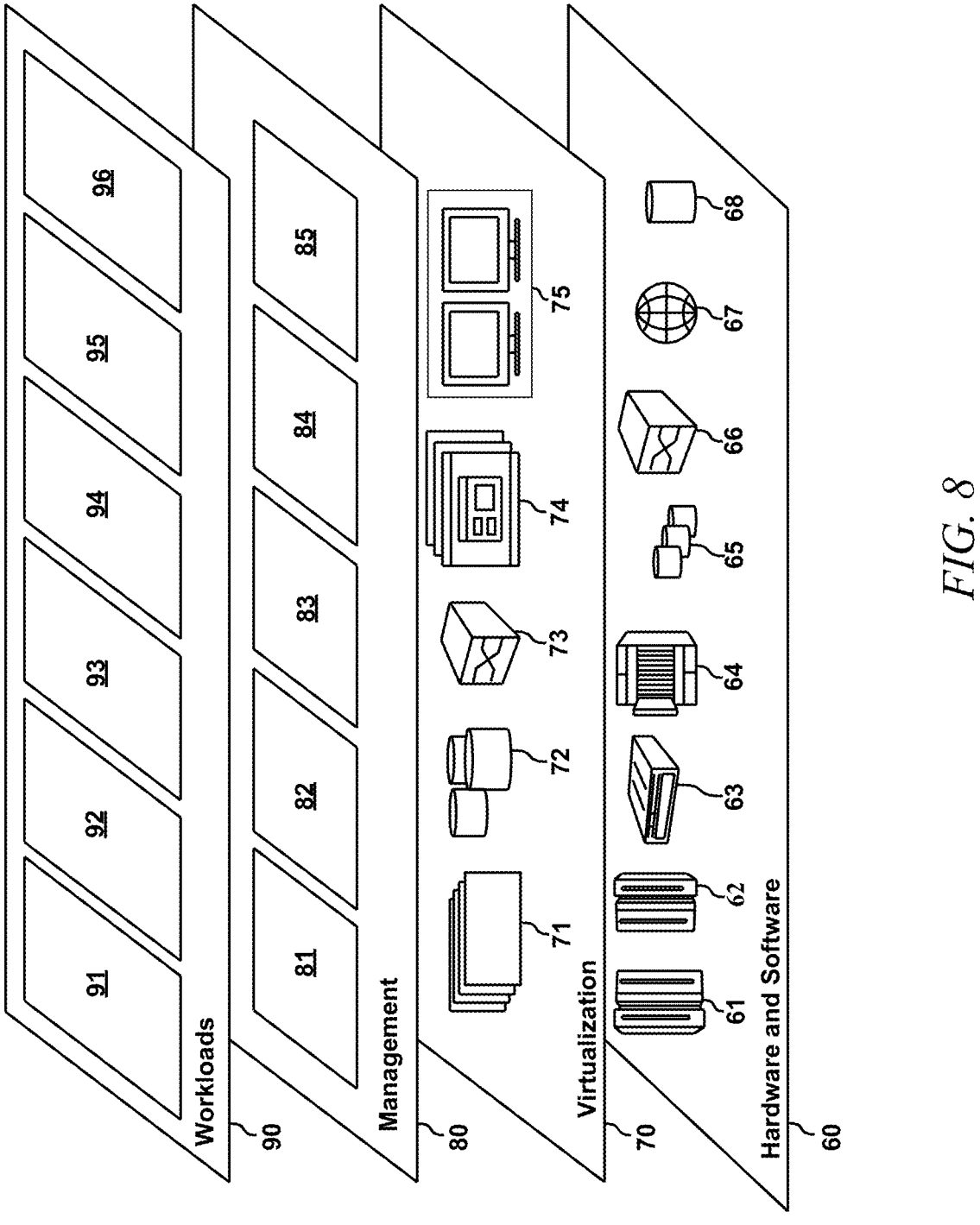
FIG. 8 depicts abstraction model layers according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and reading comprehension ensembling system 96.

Figure 9:
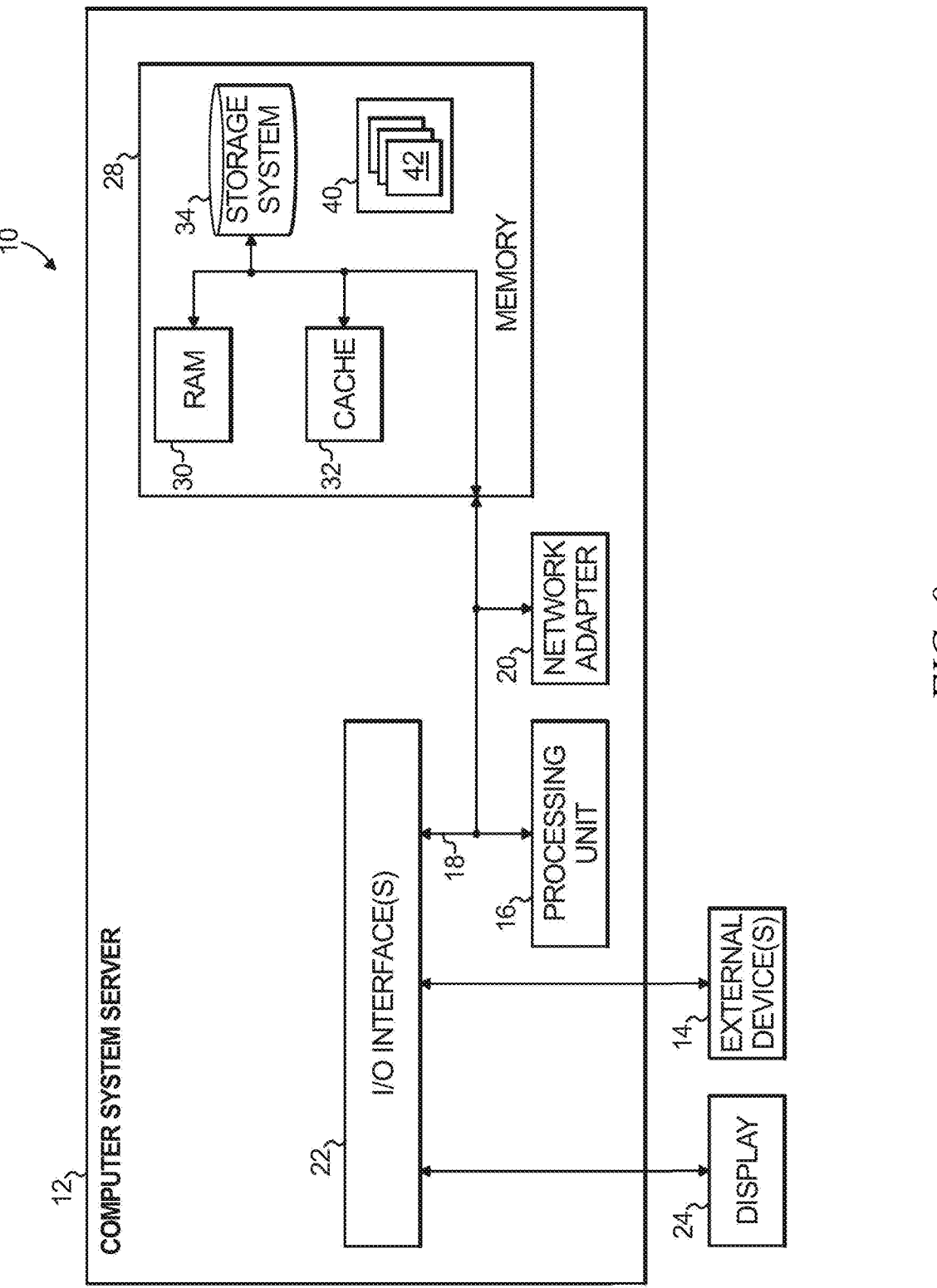
FIG. 9 depicts a computer system that may be useful in implementing one or more aspects and/or elements of the invention, also representative of a cloud computing node according to an embodiment of the present invention.

One or more embodiments of the invention, or elements thereof, can be implemented in the form of an apparatus including a memory and at least one processor that is coupled to the memory and operative to perform exemplary method steps, or in the form of a non-transitory computer readable medium embodying computer executable instructions which when executed by a computer cause the computer to perform exemplary method steps. FIG. 9 depicts a computer system that may be useful in implementing one or more aspects and/or elements of the invention, also representative of a cloud computing node according to an embodiment of the present invention. Referring now to FIG. 9, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/ server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/ non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 9, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 9) running a server program. It will be understood that such a physical server may or may not include a display and keyboard.

One or more embodiments can be at least partially implemented in the context of a cloud or virtual machine environment, although this is exemplary and non-limiting. Reference is made back to FIG. 7, FIG. 8, and accompanying text.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:

receiving a question via a graphical user interface (GUI);

obtaining, via the GUI, at least one parameter selected from the group consisting of a number of documents to be retrieved and a size of corpus to be retrieved;

obtaining from an information retrieval service, based on the at least one parameter, multiple passages of text potentially relevant to the question;

receiving, via the GUI, (i) a selection of a number of question-answering models to be ensembled, based on an on-the-fly tradeoff of speed versus accuracy, and (ii) a selection of at least one of the multiple passages of text;

producing a plurality of answers to the question by running a plurality of question-answering models, consistent with the selection of the number of question-answering models to be ensembled and the selection of the at least one of the multiple passages, on the at least one of the multiple passages of text;

producing an ensembled answer by ensembling the plurality of answers according to their respective confidence scores;

displaying, via the GUI, the ensembled answer in context of a passage of text from the multiple passages of text, with the ensembled answer being visually marked in the passage of text; and displaying, via the GUI, two or more answers of the plurality of answers in addition to the ensembled answer, with the two or more answers being visually marked in the passage of text in a manner different than the ensembled answer along with an overall confidence score of the ensembled answer.

2. The method of claim 1, further comprising visually marking each character of each of the two or more of the plurality of answers according to a number of answers in which each character occurs.

3. The method of claim 2, further comprising visually marking each character of the two or more of the plurality of answers in a color corresponding to the number of answers in which each character occurs.

4. The method of claim 2, further comprising visually marking each character of the two or more of the plurality of answers with a font size corresponding to the number of answers in which each character occurs.

5. The method of claim 1, further comprising:

obtaining a second passage of text potentially relevant to the question;

producing a second plurality of answers to the question by running the plurality of question-answering models, consistent with the selection of the number of question-answering models to be ensembled, on the second passage of text;

producing a second ensembled answer by ensembling the second plurality of answers according to their respective confidence scores; and displaying, via the GUI, the second ensembled answer in context of the second passage of text, with the second ensembled answer being visually marked in the second passage of text.

6. A computer program product comprising one or more computer readable storage media that embody computer executable instructions, which when executed by a computer cause the computer to:

receive a question via a graphical user interface (GUI);

obtain, via the GUI, at least one parameter selected from the group consisting of a number of documents to be retrieved and a size of corpus to be retrieved;

obtain from an information retrieval service, based on the at least one parameter, multiple passages of text potentially relevant to the question;

receive, via the GUI, (i) a selection of a number of question-answering models to be ensembled, based on an on-the-fly tradeoff of speed versus accuracy, and (ii) a selection of at least one of the multiple passages of text;

produce a plurality of answers to the question by running a plurality of question-answering models, consistent with the selection of the number of question-answering models to be ensembled and the selection of the at least one of the multiple passages, on the at least one of the multiple passages of text;

produce an ensembled answer by ensembling the plurality of answers according to their respective confidence scores;

display, via the GUI, the ensembled answer in context of a passage of text from the multiple passages of text, with the ensembled answer being visually marked in the passage of text; and display, via the GUI, two or more answers of the plurality of answers in addition to the ensembled answer, with the two or more answers being visually marked in the passage of text in a manner different than the ensembled answer along with an overall confidence score of the ensembled answer.

7. The computer program product of claim 6, wherein the computer executable instructions, when executed by the computer, cause the computer to visually mark each character of each of the two or more answers according to a number of answers in which each character occurs.

8. The computer program product of claim 7, wherein the computer executable instructions, when executed by the computer, cause the computer to visually mark each character of the two or more answers in a color corresponding to the number of answers in which each character occurs.

9. The computer program product of claim 7, wherein the computer executable instructions, when executed by the computer, cause the computer to visually mark each character of the two or more answers with a font size corresponding to the number of answers in which each character occurs.

10. The computer program product of claim 6, wherein the computer executable instructions, when executed by the computer, cause the computer to:

obtain a second passage of text potentially relevant to the question;

produce a second plurality of answers to the question by running the plurality of question-answering models, consistent with the selection of the number of question-answering models to be ensembled, on the second passage of text;

produce a second ensembled answer by ensembling the second plurality of answers according to their respective confidence scores; and display, via the GUI, the second ensembled answer in context of the second passage of text, with the second ensembled answer being visually marked in the second passage of text.

11. An apparatus comprising:

a memory embodying computer executable instructions; and at least one processor, coupled to the memory, and operative by the computer executable instructions to:

receive a question via a graphical user interface (GUI);

obtain, via the GUI, at least one parameter selected from the group consisting of a number of documents to be retrieved and a size of corpus to be retrieved;

obtain from an information retrieval service, based on the at least one parameter, multiple passages of text potentially relevant to the question;

receive, via the GUI, (i) a selection of a number of question-answering models to be ensembled, based on an on-the-fly tradeoff of speed versus accuracy, and (ii) a selection of at least one of the multiple passages of text;

produce a plurality of answers to the question by running a plurality of question-answering models, consistent with the selection of the number of question-answering models to be ensembled and the selection of the at least one of the multiple passages, on the at least one of the multiple passages of text;

produce an ensembled answer by ensembling the plurality of answers according to their respective confidence scores;

display, via the GUI, the ensembled answer in context of a passage of text from the multiple passages of text, with the ensembled answer being visually marked in the passage of text; and display, via the GUI, two or more answers of the plurality of answers in addition to the ensembled answer, with the two or more answers being visually marked in the passage of text in a manner different than the ensembled answer along with an overall confidence score of the ensembled answer.

12. The apparatus of claim 11, wherein the at least one processor is configured to visually mark each character of each of the two or more answers according to number of answers in which each character occurs.

13. The apparatus of claim 12, wherein the at least one processor is configured to visually mark each character of the two or more answers in a color corresponding to the number of answers in which each character occurs.

14. The apparatus of claim 11, wherein the at least one processor is configured to:

obtain a second passage of text potentially relevant to the question;

produce a second plurality of answers to the question by running the plurality of question-answering models, consistent with the selection of the number of question-answering models to be ensembled, on the second passage of text;

produce a second ensembled answer by ensembling the second plurality of answers according to their respective confidence scores; and display, via the GUI, the second ensembled answer in context of the second passage of text, with the second ensembled answer being visually marked in the second passage of text.

\* \* \* \* \*